United States Patent [19]

Schroeder

[11] Patent Number: 4,862,918
[45] Date of Patent: Sep. 5, 1989

[54] VALVED CONNECTION APPARATUS

[75] Inventor: Alfred A. Schroeder, San Antonio, Tex.

[73] Assignee: Lancer Corporation, San Antonio, Tex.

[21] Appl. No.: 238,316

[22] Filed: Aug. 29, 1988

[51] Int. Cl.⁴ .............................................. F16L 37/28
[52] U.S. Cl. ............................. 137/614.19; 251/149.8; 251/149.4
[58] Field of Search .......................... 251/149.8, 149.4; 137/614.2, 614.03, 329.1, 329.2, 329.3, 614, 614.19

[56] References Cited

U.S. PATENT DOCUMENTS

| | | | |
|---|---|---|---|
| 2,850,298 | 9/1958 | Clark | 137/614.03 |
| 2,890,718 | 6/1959 | Smith | 137/614.2 |
| 4,002,186 | 1/1977 | Fink et al. | 137/614.03 |
| 4,509,554 | 4/1985 | Failla | 137/329.1 |

Primary Examiner—A. Michael Chambers
Attorney, Agent, or Firm—Cox & Smith Incorporated

[57] ABSTRACT

A valved fluid connection apparatus is disclosed. When mounted within an opening of a fluid container, the apparatus seals the fluid inside the container until an actuating barrel is inserted to open a valve which allows fluid to exit from the container. The apparatus is particularly suitable for use in flexible bags containing fluid juice with high pulp content as a fluid pathway with wide clearances is established when the valve is opened.

13 Claims, 2 Drawing Sheets

VALVED CONNECTION APPARATUS

BACKGROUND

Valved connection devices are used to seal a container filled with fluid until a connector piece engages the device to open a spring operated valve. The connector piece is typically attached to a hose or a nozzle to direct the flow of fluid. The container remains sealed until the connector piece is engaged. These devices are particularly suitable for use in flexible containers or bags filled with fluid in which no air displacement of fluid is necessary for fluid to flow outward.

Typical connection devices as have existed before are plagued by a number of problems, however. When used with bags containing fruit juices with high pulp content, prior devices are prone to being plugged with pulp as the juice flows through narrow passageways when the value is open. Prior devices have also been difficult to operate because of the large springs necessary to ensure complete closure of the valve. Overcoming these problems is an object of the present invention.

SUMMARY OF THE INVENTION

The present invention is a valved connection apparatus comprising a valve body having a bore therethrough with a rear inlet section for mounting within an opening of a fluid container and a front outlet section. The valve is made up of a sealing sleeve and a retaining disc. The sealing sleeve is mounted within the front outlet section and has a port allowing fluid to pass through. The outer edges of the sealing sleeve sealingly engage the inner walls of the outlet section. A retaining disc mounted within the valve body in front of the sealing sleeve seals the port in the sealing sleeve when the sleeve is urged frontward into engagement with the disc. In a preferred embodiment a coiled spring mounted within the valve body is used for this purpose.

A connector piece, which may be attached to a hose or nozzle, is used to connect the hose or nozzle to the fluid container and open the valve of the connection device. A valve actuation barrel of the connector piece is inserted into the valve body outlet section to urge the sealing sleeve inward and out of engagement with the retaining disc in order to establish an open fluid flow pathway.

DETAILED DESCRIPTION OF THE INVENTION

Figure 1:
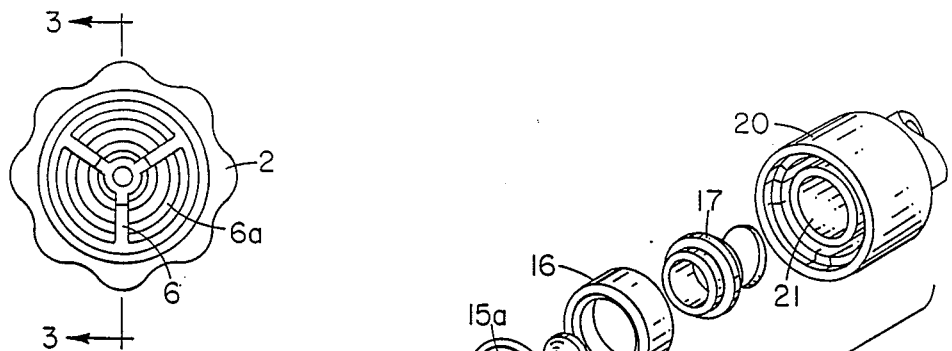
FIG. 1 is an end-on view of the rear inlet section of the valve body.
Figure 2:
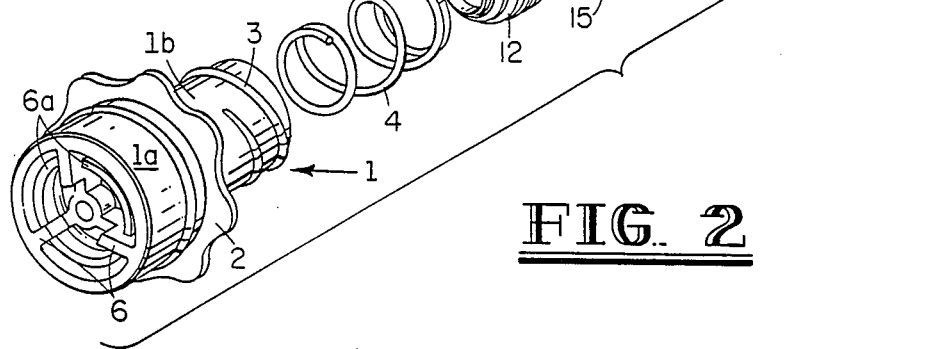
FIG. 2 is an exploded perspective view of the valve body and its internal components in an unassembled state along with the connector body.
Figure 3:
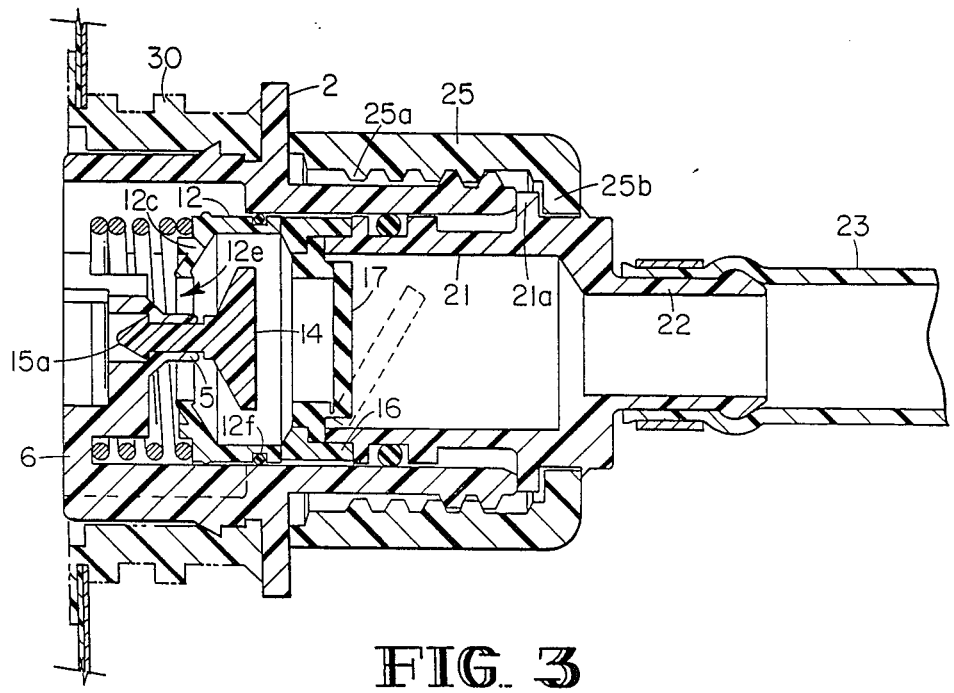
FIG. 3 is a cross-section of the apparatus with the valve actuator barrel inserted to open the valve.
Figure 4:
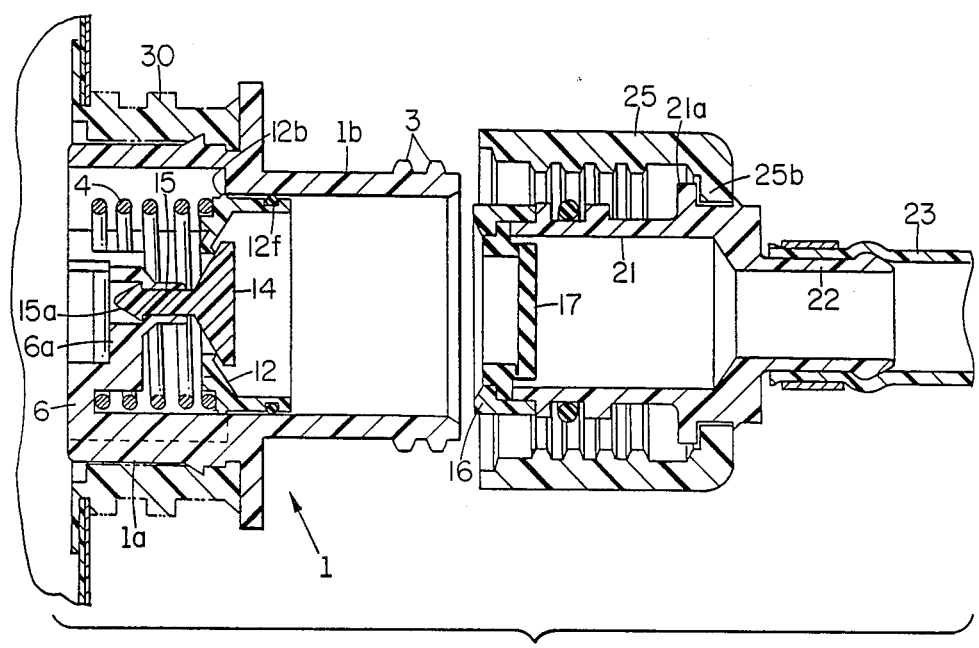
FIG. 4 is a cross-section of the apparatus with the valve actuator barrel withdrawn to leave the valve closed.
Figure 5:
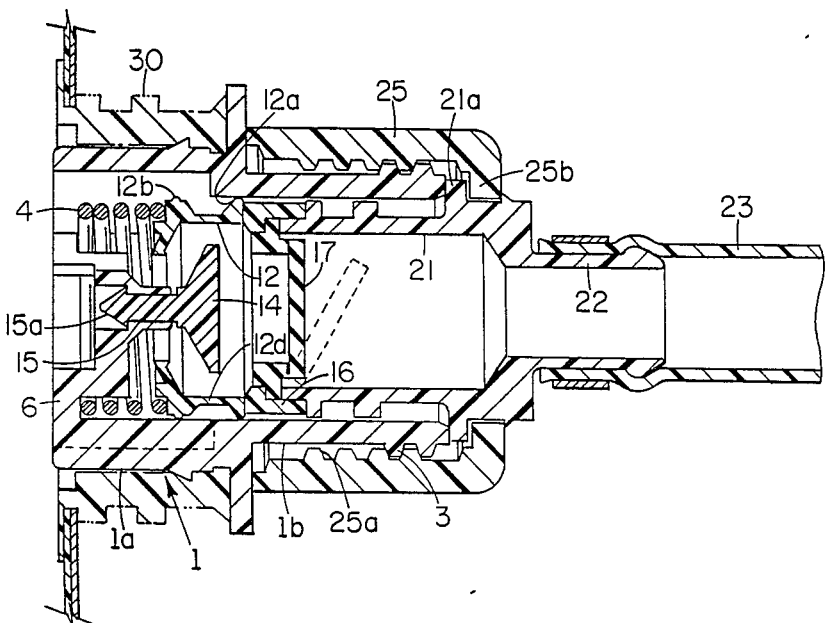
FIG. 5 shows a cross-section of an alternative embodiment of the apparatus with the valve actuator barrel inserted to open the valve.

FIG. 2 shows an exploded view of the valved connection apparatus in its unassembled state. All of the individual components are designed to be constructed of a molded polymer and then manually assembled. The valve body 1 is divided into two sections, an inlet section 1a and an outlet section 1b. FIG. 1 shows an end-on view of the inlet section. The inlet section 1a is designed to sealingly fit within a container opening 30 as shown in FIGS. 3 through 5. The valve body 1 then serves to seal the fluid contents inside the container until a valve actuating connector is engaged as will be described more fully below.

Referring to FIG. 2 and 4, a spring 4 is inserted into the valve body 1 and seated into notches 6a of ribs 6 located in the inlet section 1a. Spring 4 engages an inwardly projecting shoulder 12c of sealing sleeve 12 to urge the sleeve outward and into sealing engagement with retaining disc 14. Port 12e is bordered by an inwardly projecting shoulder 12c which sealingly contacts retaining disc 14. Retaining disc 14 is secured by having disc stem 15 inserted into stem cylinder 5. Stem cylinder 5 is mounted within the bore of valve body 1 by a plurality of ribs 6 extending radially outward from cylinder 5 to the inner wall of the valve body. The stem tip 15a is enlarged so as to prevent frontward movement of disc 14 in response to pressure from sealing sleeve 12. In this manner, retaining disc 14 both limits the travel of sealing sleeve 12 in response to pressure from spring 4 and seals the port 12e within the sleeve. Sealing sleeve 12 also sealingly engages the inner walls of outlet section 1b to prevent any fluid flow through that pathway. An O-ring 12f is shown in FIGS. 3 and 4 for this purpose. A sealing ring integrally a part of the sealing sleeve 12 could also be used. In this manner, the valve, made up of sealing sleeve 12 and retaining disc 14, is maintained in a closed position.

Referring next to FIGS. 2 and 3, the engagement of a valve actuating connector with the apparatus will be described. Connector piece 20 is made up of a valve actuator barrel 21 and a nozzle 22. Nozzle 22 may typically be connected to a hose 23 or other fluid outlet pathway. As shown in FIG. 3, when valve actuator barrel 21 is inserted into the outlet section 1b of the valve body 1, sealing sleeve 12 is urged rearward and away from sealing engagement with retaining disc 14. A fluid flow pathway with wide clearances from the container to nozzle 22 is thereby established with fluid flowing between ribs 6 and through the open port 12e to reach the nozzle. In the preferred embodiment illustrated in the figures, a check valve sleeve 16 is interposed between sealing sleeve 12 and valve actuating barrel 21. Mounted within check valve sleeve 16 is a flap-type check valve 17 which prevents any contaminating retrograde flow from the nozzle 22 to the fluid container.

In order to connect the connector piece 20 to the valve body 1 and facilitate the inward insertion of the valve actuator barrel 21 into the outlet section 1b, a nut 25 is slipped over the connector piece 20 with inner threads 25 engaging threads 3 of outlet section 1b. As the nut 25 is rotated and thereby moved rearward by the threads, shoulder 25b of nut 25 engages lug ring 21a of valve actuator barrel 21 to urge barrel 21 inward and open the valve as described above. A stop ring 2 on the exterior of the valve body limits the rearward movement of the nut 25.

In an alternative embodiment illustrated in FIG. 5 with the valve in an open position, sealing sleeve 12 has a sealing ring 12a projecting radially outward to sealingly contact the inner walls of outlet section 1b. Located between the inwardly projecting shoulder 12c and the sealing ring 12a is an alignment ring 12b which also projects radially outward to contact the inner wall of outlet section 16. Alignment ring 12b and sealing ring 12a are separated by a thin section 12d of sealing sleeve 12 which does not contact the inner wall of outlet section 1b. Since the entire outer surface of sealing sleeve 12 does not contact the inner wall of outlet section 1b in this embodiment, there is less frictional resistance to the frontward urging of sealing sleeve 12 by spring 4. A smaller spring may therefore be used to maintain the valve in a closed position which makes manual actuation by inserting valve actuator barrel 21 easier. Alignment ring 12b ensures that the sealing sleeve 12 is aligned within the bore of outlet section 1b so that the seal between sealing sleeve 12 and retaining disc 14 is maintained.

Another advantage of the embodiment show in FIG. 5 is that the thin section 12d is relatively flexible. This allows the alignment ring 12b and sealing ring 12a to be deformed slightly in order to fit within the outlet section 1b when an exact fit does not occur due to manufacturing error.

All of the component parts of the present invention are designed to be easily manufactured by a molding process and then manually assembled into a working apparatus. In the preferred embodiment shown in the figures, the stem tip 15 is a conically shaped and relatively deformable so that the disc stem 15 may be easily press fit into the stem cylinder 5 and thereby snapped into place.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims:

What is claimed is:

1. A valved connection apparatus, comprising:
   a cylindrical valve body having a rear inlet section for mounting within an opening in a fluid container and a front outlet section, the two sections having a continuous bore therethrough;
   a sealing sleeve sealingly mounted within said outlet section and having a port therethrough;
   a retaining disc mounted in front of said sealing sleeve for sealing the port therethrough and have a stem extending backward through the port;
   means for holding said disc stem in a fixed position within said valve body wherein said disc stem holding means comprises a stem cylinder through which said disc stem inserts and wherein said cylinder is mounted in said valve body by a plurality of ribs extending outward from said cylinder to the inner walls of said valve body;
   resilient means for urging said sealing sleeve into sealing engagement with said retaining disc; and
   a cylindrical connector piece having a valve actuator barrel for inserting into the outlet section of said valve body and urging said sealing sleeve out of engagement with said retaining disc to allow fluid flow through said valve body and said connector piece.

2. The apparatus as set forth in claim 1 wherein said resilient means comprises a coiled spring mounted within said valve body between said ribs and said sealing sleeve.

3. The apparatus of claim 1 wherein said front outlet section is threaded on the exterior and further comprising a nut into which said front outlet section may be threadably inserted having an inwardly projecting shoulder for engaging a lug ring on the exterior of said connector piece in order to urge said valve actuator barrel inward as said nut is turned.

4. The apparatus of claim 3 further comprising a stop ring on the exterior of said valve body for limiting the rearward travel of said nut as said nut is turned.

5. The apparatus of claim 1 further comprising check valve sleeve for interposition between said valve actuator barrel and said sealing sleeve wherein a flap-type check valve is mounted within said check valve sleeve in order to prevent retrograde flow of fluid from said connector body to said valve body.

6. The apparatus of claim 2 wherein said sealing sleeve comprises:
   an inwardly projecting shoulder for engaging said coiled spring;
   a sealing ring projecting radially outward to sealingly engage the inner wall of said valve body; and
   an alignment ring located between said sealing ring and said inwardly projecting shoulder for aligning said sealing sleeve when urged outward by said coiled spring.

7. The apparatus of claim 6 wherein said alignment ring and said sealing ring are connected by a thin section of said sealing ring not in contact with the inner wall of said valve body.

8. The apparatus of claim 1 wherein said disc system has an enlarged tip for securing said stem in said stem cylinder.

9. A valved connection apparatus, comprising:
   a cylindrical valve body having a rear inlet section for mounting within an opening in a fluid container and a front outlet section, the two sections having a continuous passageway therethrough;
   a sealing sleeve sealingly mounted within said outlet section and having a port therethrough;
   a retaining disc mounted in front of said sealing sleeve for sealing the port therethrough and have a stem extending backward through the port;
   means for holding said disc stem in a fixed position within said valve body wherein said disc stem holding means comprises a stem cylinder through which said disc stem inserts and wherein said cylinder is mounted in said valve body by a plurality of ribs extending outward from said cylinder to the inner walls of said valve body; and
   resilient means for urging said sealing sleeve into sealing engagement with said retaining disc.

10. The apparatus as set forth in claim 9 wherein said resilient means comprises a coiled spring mounted within said valve body between said ribs and said sealing sleeve.

11. The apparatus of claim 10 wherein said sealing sleeve comprises:
    an inwardly projecting shoulder for engaging said coiled spring;
    a sealing ring projecting radially outward to sealingly engage the inner wall of said valve body; and
    an alignment ring located between said sealing ring and said inwardly projecting shoulder for aligning said sealing sleeve when urged outward by said coiled spring.

12. The apparatus of claim 11 wherein said alignment ring and said sealing ring are connected by a thin section of said sealing ring not in contact with the inner wall of said valve body.

13. The apparatus of claim 9 wherein said disc stem has an enlarged tip for securing said stem in said stem cylinder.

* * * * *